United States Patent

[11] 3,628,062

[72] Inventor Yves de Bretagne
  Amiens, France
[21] Appl. No. 882,996
[22] Filed Dec. 8, 1969
[45] Patented Dec. 14, 1971
[73] Assignee Honeywell Inc.
  Minneapolis, Minn.

[54] LIMIT CONTROL APPARATUS WITH MOMENTARY POWER FAILURE BRIDGE
  12 Claims, 1 Drawing Fig.
[52] U.S. Cl. ............................................ 307/255, 307/232, 307/296
[51] Int. Cl. ........................................ H03k 17/00
[50] Field of Search ........................................ 307/255, 232, 262, 296, 310, 252.90

[56] References Cited
UNITED STATES PATENTS
3,191,048  6/1965  Cowen ........................ 250/221
3,244,910  4/1966  Leifer ........................... 307/255
3,417,296  12/1968  Wallentowitz ............... 307/252 W

*Primary Examiner*—Donald D. Forrer
*Assistant Examiner*—B. P. Davis
*Attorneys*—Lamont B. Koontz and Francis A. Sirr ABSTRACT: A limit control having an alternating current signal whose phase reverses when a limit condition, such as a high limit, occurs. The limit control includes a phase detector which controls an output relay to deenergize the relay and signal the limit condition upon the occurrence of such a phase reversal, and a memory power failure bridge which operates for a short time period after a power failure to (1) modify the phase detector so that it no longer requires a specific phase input to maintain the relay energized, and (2) to supply an alternating current signal to the input of the phase detector, whereupon, if power is not restored after the short time period, the relay becomes deenergized.

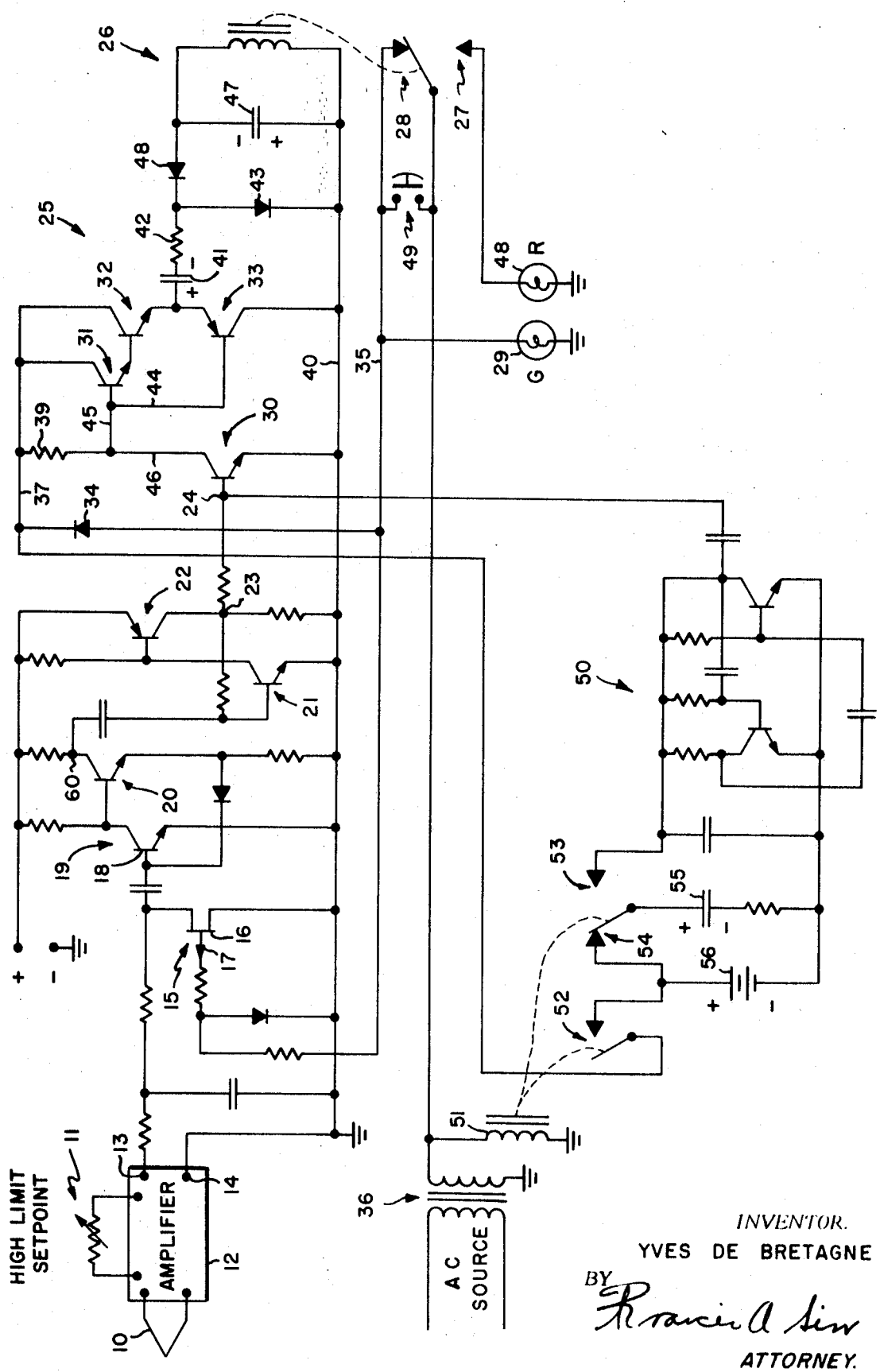

LIMIT CONTROL APPARATUS WITH MOMENTARY POWER FAILURE BRIDGE

BACKGROUND AND SUMMARY OF THE INVENTION

Limit control apparatus generally utilize a sensor, such as a thermocouple, whose output is compared to a selected limit setpoint. When the sensor output indicates that a limit condition does not exist, one output condition exists. For example, a green light is energized. When the sensor output indicates that a limit condition has been reached, a second output condition exists. For example, a red light is energized.

This invention utilizes a limit control apparatus wherein an alternating current signal reverses phase when a limit condition is reached. A phase detector detects this phase reversal and produces an output indicative of the limit condition. In order to prevent nuisance indication of a limit condition when a momentary power failure occurs, this invention provides a structure which is responsive to such power failure and is operable for a short period of time, for example 15 seconds, to provide an alternating current signal of unknown phase to the input of the phase detector, and to also modify the energizing voltage for the phase detector such that the detector accepts an alternating current input of any phase and thereby maintains an output indicative of the absence of a limit condition. However, if after 15 seconds have expired power is not restored, the phase detector produces an output indicative of the limit condition.

BRIEF DESCRIPTION OF THE DRAWING

The single FIGURE is a schematic showing of the preferred embodiment of the invention.

DESCRIPTION OF THE PREFERRED EMBODIMENT

Referring to the single FIGURE, a condition sensor 10, in the form of a thermocouple, is adapted to be associated with a temperature condition, the high limit of which is to be sensed. The high limit temperature to be detected is controlled by high limit setpoint potentiometer 11. Thermocouple 10 and potentiometer 11 are connected to amplifier 12 whose output terminals 13 and 14 provide a variable magnitude, reversible polarity, direct current condition responsive signal, the magnitude of which is determined by the temperature which thermocouple 10 senses and the polarity of which is determined by the temperature in accordance with its comparison to a high limit setpoint temperature. When the temperature sensed by thermocouple 10 is below the setpoint temperature, terminal 13 is negative with respect to terminal 14. When the sensed temperature is equal to the setpoint temperature, terminals 13 and 14 are at the same potential level. When the temperature sensed by thermocouple 10 is above the setpoint temperature, terminal 13 is positive with respect to terminal 14.

The signal on terminal 13 is connected in circuit with a shunt chopper 15 having a field effect transistor 16 whose gate electrode 17 is driven by conductor 35 and alternating current source 36. Chopper 15 has its gate 17 connected to conductor 35 and thus the steady state direct current signal at terminal 13 is chopped in synchronism with the AC line.

As a result of chopper means 15, the direct input signal at terminal 13 is converted to an alternating current signal and is applied to base electrode 18 of transistor 19. The phase of the alternating current signal applied to base 18 reverses as the temperature at thermocouple 10 varies from one side of setpoint to the other.

Transistors 19 and 20 comprise an amplifier stage. With no alternating current signal present at base 18, the potential level at terminal 60 is of a steady state value. When an alternating current signal is present at base 18, this signal is amplified and appears with little or no phase shift at terminal 60. Transistors 21 and 22 are switching transistors and are both nonconductive when no alternating current signal is present at terminal 60. When an alternating current signal is present at terminal 60, transistors 21, 22 are both conductive during the positive half cycle of this signal and both are nonconductive during the negative half cycle of this signal.

As a result of the above described transistor circuit, a square-wave alternating current signal is developed at terminal 23, this signal reversing phase as the temperature of thermocouple 10 varies from one side of setpoint to the other. Terminal 23 is connected to input 24 of a phase detector 25 having an output 26 in the form of a relay controlling a normally closed switch 27 and a normally open switch 28. With the apparatus as shown, the temperature of thermocouple 10 is below the high limit setpoint temperature, relay 26 is energized, and switch 28 is closed to energize an output indicator in the form of green indicator light 29.

Referring specifically to phase detector 25, this phase detector includes transistors 30, 31, 32 and 33. Energizing voltage for this transistor network is supplied by a half-wave rectifier in the form of diode 34 connected to conductor 35. This conductor is connected through switch 28 to the secondary winding of a transformer 36 whose primary winding is connected to a source of alternating current. Half-wave rectifier positive voltage is applied to conductor 37 of phase detector 25 during only one half cycle of the AC line.

As mentioned, the apparatus is shown in a condition wherein the temperature of thermocouple 10 is below the high-limit setpoint temperature. For this condition, the negative half cycle of the input signal applied to base electrode 18 of transistor 19 occurs during the half cycle of the alternating current source in which positive voltage is applied to conductor 37. A negative half cycle also appears at terminal 60 during this half cycle and transistors 21 and 22 are nonconductive. With transistor 22 nonconductive, no input bias is developed to forward bias the base-to-emitter input of transistor 30. Thus, during this half cycle of the alternating current source, current can flow from conductor 37 through resistor 39, the base-to-emitter circuits of transistors 31 and 32, capacitor 41, resistor 42 and diode 43 to conductor 40, and current can flow from conductor 37 through the collector-to-emitter circuits of transistors 31 and 32, capacitor 41, resistor 42 and diode 43 to conductor 40. As a result of this current flow, capacitor 41 charges to the polarity indicated.

During the next half cycle of the alternating current source, a positive voltage is applied to base electrode 18 of transistor 19 and substantially zero voltage appears at conductor 37. Transistor 22 is now rendered conductive and a forward bias is developed for transistor 30. With transistor 30 biased to be conductive, capacitor 41 discharges through a circuit which can be traced from the positive terminal of this capacitor through the emitter-to-base circuit of transistor 33, conductors 44, 45 and 46, the collector-to-emitter circuit transistor 30, conductor 40, capacitor 47 in parallel with the winding of relay 26, diode 48 and resistor 42 to the negative terminal of capacitor 41. Also, since transistor 33 is thereby biased conductive, a circuit can be traced from the positive terminal of capacitor 41 through the collector-to-base circuit of transistor 33, capacitor 47 in parallel with the winding of relay 26, diode 48 and resistor 42 to the negative terminal of capacitor 41. These circuits are effective to transfer the charge on capacitor 41 to capacitor 47, to charge capacitor 47 to the polarity indicated. So long as a below high-limit condition continues to exist, capacitor 41 is charged during the half cycle of the alternating current source in which conductor 37 is positive, and this charge is then transferred to capacitor 47 during the half cycle of the alternating current source in which conductor 37 has substantially no voltage applied thereto. In this manner, relay 26 is maintained continuously energized.

When an above high-limit temperature is sensed by thermocouple 10, the polarity of the direct current signal at terminal 13 reverses and the phase of the alternating current signal applied to base electrode 18 reverses. Transistor 22 is now rendered conductive during the half cycle of the alternating current source in which conductor 37 is positive. Since transistor 22 is conductive, a forward bias is developed for transistor 30 and a current now flows from conductor 37 through resistor 39, through conductor 46 and the collector-to-emitter circuit of transistor 30 to conductor 40. Thus, capacitor 41 does not receive a charge. In this manner, the charging of capacitor 47 is interrupted and relay 26 becomes deenergized. The opening of switch 28 deenergizes indicator light 29. The closing of switch 27 energizes red indicator light 48 to signal the presence of a high-limit condition.

After interruption of the high-limit condition, the apparatus may be reset to the condition shown by manually closing reset switch 49, maintaining this switch closed until relay 26 is again energized in response to the absence of the high-limit temperature.

This invention provides a momentary power failure bridge to insure that a nuisance indication of a high-limit condition is not provided upon a momentary power failure, which may exist for a relatively short 15 second time period. This momentary power failure bridge includes an oscillator 50 and a power failure responsive means 51 in the form of a relay controlling normally closed switches 52 and 53 and normally open switch 54. Relay 51 is shown in its energized condition wherein switches 52 and 53 are open and switch 54 is closed.

With relay 51 energized, as it is when power exists at alternating current source 36, capacitor 55 is charged to the polarity indicated from a battery 56. A charging means may be provided to maintain battery 56 charged from the alternating current source. Upon the occurrence of a power failure, relay 51 is deenergized and capacitor 55 is connected as a source of limited operating voltage for oscillator 50. As a result of the closing of switch 53, oscillator 50 is energized and an alternating current signal of unknown phase is applied to input terminal 24 of phase detector 25. The closing of switch 52 connects the positive terminal of battery 56 to conductor 37, thus causing phase detector 25 to operate in the above described fashion, to first charge capacitor 41 and then transfer its charge to capacitor 47, independent of the phase of the input signal applied to terminal 24. Thus, so long as sufficient charge remains on capacitor 55 to render oscillator 50 operative and provide an alternating current signal at terminal 24, relay 26 is maintained energized. However, after the expiration of a relatively short time period, for example 15 seconds, capacitor 55 is discharged and relay 26 becomes deenergized to provide an above high-limit indication by energizing red indicator light 48 upon the restoration of power. If power is restored within the 15 second period, relay 51 is again energized and phase detector 25 once again requires a specific phase input signal at terminal 24 in order that relay 26 be maintained energized.

The embodiments of the invention in which an exclusive property or right is claimed are defined as follows:

1. In apparatus having a detector circuit whose input is connected to receive a first input signal from a condition responsive circuit and whose output is of a given state only so long as the input signal is of a given characteristic, the detector being energized by an electrical source of power, the improvement comprising;

momentary power failure bridging means, including power failure responsive means connected to said electrical source, said power failure bridging means being connected to the input of said detector circuit and being effective for a short time period upon a failure of said electrical source to apply a second input signal to the input of said detector, and said momentary power failure bridging means being effective to modify said detector in a manner to cause said detector to respond to said second input signal to maintain the output of said given state for said short time period regardless of the characteristic of said second input signal.

2. Apparatus as defined in claim 1 wherein said detector is a phase detector, wherein said first input signal is a reversible phase alternating current input signal, wherein the output of said phase detector is of said given state only so long as said first input signal is of a given phase, wherein said phase detector is energized by and receives a phase reference from an alternating current source, and wherein said second input is an alternating current input signal.

3. Apparatus as defined in claim 2 wherein said first input signal is a condition responsive signal whose phase reverses from said given phase to the opposite phase upon the occurrence of a limit condition, and wherein the output of said phase detector of said given state is the electrically energized state of an output means, which energized state is maintained for said short time period upon a failure of said alternating current source.

4. Apparatus as defined in claim 3 wherein said momentary power failure bridging means includes an oscillator which is effective upon a power failure to apply an alternating current input signal to the input of said phase detector.

5. Apparatus as defined in claim 4 wherein said power failure responsive means includes switch means having a first state when energized and a second state when deenergized; including, a direct current source, a capacitor, first circuit means controlled by said switch means when in said first state to connect said capacitor to said direct current source, and second circuit means controlled by said switch means when in said second state to disconnect said capacitor to said direct current source and to connect said capacitor to said oscillator as a source of operating voltage therefor.

6. Apparatus as defined in claim 5 wherein said phase detector is energized by and receives a phase reference from said alternating current source by virtue of a half-wave rectifier, and wherein third circuit means is controlled by said switch means when in said second state to connect said direct current source to energize said phase detector.

7. Apparatus as defined in claim 2 wherein said first input signal is provided by said condition responsive circuit, said condition responsive circuit comprising chopper means which is adapted to receive a variable magnitude and reversible polarity direct current condition responsive input, and wherein said chopper means is driven by said alternating current source.

8. Apparatus as defined in claim 7 wherein said momentary power failure bridging means includes oscillator means effective upon a power failure to apply an alternating current input signal of unknown phase to the input of said phase detector.

9. Apparatus as defined in claim 8 wherein said power failure responsive means assumes a given state when power has failed; including, a source of limited direct current energy whose energy is expended in a short time period, and circuit means controlled by said power failure responsive means only when in said given state to connect said source of limited direct current energy to energize said oscillator means.

10. Apparatus as defined in claim 9 wherein said phase detector is energized by and receives a phase reference from said alternating current source by virtue of a pulsating direct current voltage, and wherein further circuit means is controlled by said power failure responsive means only when in said given state to connect a source of direct current energy to energize said phase detector.

11. A phase detector for comparing the phase of an alternating current signal to be detected to a reference source of unfiltered, half wave, rectified, alternating current comprising;

a reference source of unfiltered, half wave, rectified, alternating current, a first transistor of a given conductivity type having an input electrode adapted to receive said alternating current signal to be detected, having an output electrode connected to said reference source of rectified alternating current, and having a common electrode connected to reference potential, a second transistor of said given conductivity type and a third transistor of the opposite conductivity type, each of said transistors having an input electrode, an output electrode and a common electrode, circuit means connecting the input electrodes of said second and third transistors to the output electrode of said first transistor, circuit means connecting the output electrode of said second transistor to said reference source of rectified alternating current, circuit means connecting the output electrode of said third transistor to said reference potential, and output means connected from said reference potential to the common electrodes of said second and third transistors said output means having a first state when said reference source bears a first phase relationship to said alternating current signal to be detected and having a second state when said reference source bears a second phase relationship to said alternating current signal to be detected.

12. Apparatus as defined in claim 1 wherein said output means comprises a first capacitor, means connecting said first capacitor to said common electrodes of said second and third transistors for charging said capacitor when said first phase relationship exists, a second capacitor, a load circuit connected to said second capacitor; and means connecting said second capacitor to said first capacitor for discharging said first capacitor into said second capacitor when said first phase relationship exists, whereby both capacitors are discharged when said second phase relationship exists.

* * * * *